FIG_1

United States Patent Office 3,701,768
Patented Oct. 31, 1972

3,701,768
SIMPLE PROTEIN AND METHOD OF DERIVING IT FROM LIVER USING AN AQUEOUS SOLUTION OF A DIVALENT METAL ION
Jack G. Fortini, Oakland, Walter A. Blair, Palo Alto, and Gerold M. Grodsky, San Francisco, Calif., assignors to Blair/Johnson, Inc., Palo Alto, Calif.
Continuation-in-part of application Ser. No. 763,292, Sept. 27, 1968, which is a continuation-in-part of abandoned application Ser. No. 307,404, Sept. 9, 1963, which in turn is a continuation-in-part of abandoned application Ser. No. 5,376, Jan. 29, 1960. This application Dec. 27, 1971, Ser. No. 212,341
Int. Cl. C07g 7/00
U.S. Cl. 260—112 R          12 Claims

ABSTRACT OF THE DISCLOSURE

A new simple protein of approximately 25,000 molecular weight exhibiting biological activity and method of deriving it from liver. The protein facilitates glucose uptake in muscle as well as glycogen deposition, leading to utility in the treatment of uremia and shock in animals.

CROSS REFERENCES

This application is a continuation-in-part of application Ser. No. 763,292 filed Sept. 27, 1968, now abandoned, which is a continuation-in-part of application Ser. No. 307,404, filed Sept. 9, 1963, now abandoned, which is a continuation-in-part of application Ser. No. 5,376, filed Jan. 29, 1960, now abandoned.

BACKGROUND OF THE INVENTION

This invention relates generally to a physiologically active material which influences glucose and urea metabolism, and a method of producing the material. More particularly, the invention relates to a protein which is derivable from liver and has the ability to increase glucose uptake and glycogen synthesis.

The preparation of extracts from liver has gained the attention of many workers, largely because of the great number of biologically active materials present in liver. Derivation of the enzyme arginase was described in an article by Mohamed and Greenberg (Archives of Biochemistry, 8:349, 1945). The extraction process of the present invention is similar in its initial steps to the process described in the article by Mohamed and Greenberg, but the present method makes use of a supernatant liquid which is discarded according to the procedure of Mohamed and Greenberg. Furthermore, the protein of the present invention exhibits physiological activity entirely different from liver arginase.

Very few agents exist which facilitate the absorption of energy sources, such as glucose, into the cells. Most proteins inhibit glucose uptake. One of the few proteins which facilitates glucose utilization and glycogen synthesis is insulin. There is a need for additional proteins manifesting these two properties in combination.

SUMMARY OF THE INVENTION AND OBJECTS

The product of the present invention influences the primary metabolism of carbohydrate and the urea cycle. The product is a biological catalyst present in large amounts in liver. It increases glucose uptake and glycogen synthesis in incubating muscle, influences glucose metabolism in isolated perfused liver and affects glycogen storage in adrenalectomized animals. It acts in vivo to increase glycogen synthesis and to improve renal functions, indicating that it is humorally transported and enters peripheral cells or influences their metabolism at the membrane level. The product is a simple protein of molecular weight approximately 25,000.

It is an object of the present invention to provide a biologically active substance.

It is a further object of the present invention to provide a product combining the properties of facilitating glucose uptake and glycogen synthesis.

It is a further object of the present invention to provide a method of deriving the product of the present invention from liver.

DESCRIPTION OF THE PREFERRED EMBODIMENTS

Figure 1:
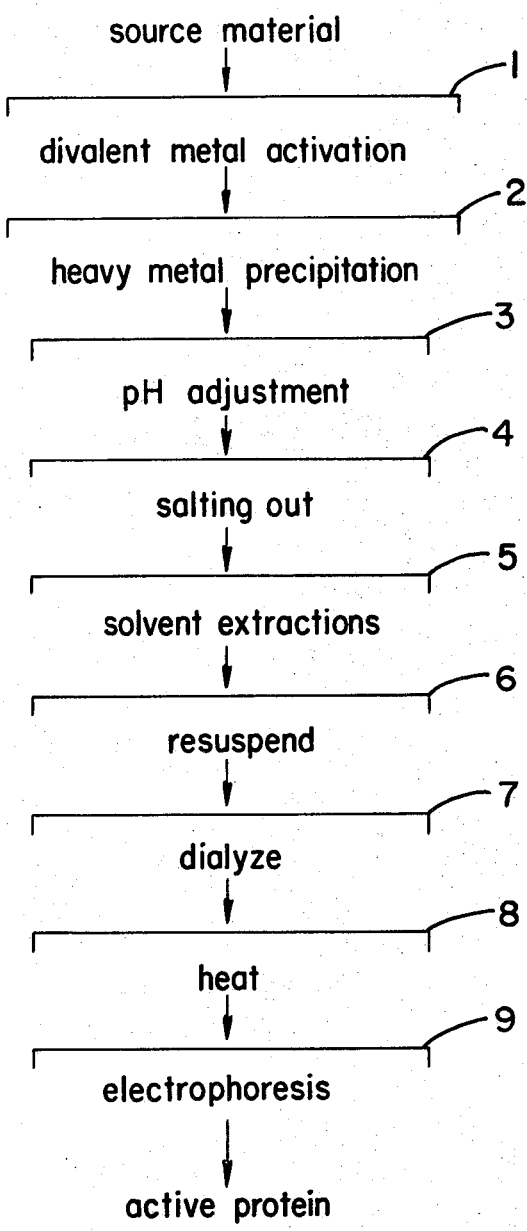
FIG. 1 is a flow sheet indicating the steps in extracting the product of the present invention from liver.

The exact structure of the protein of the present invention is not precisely known. It possesses the characteristic polypeptide structure of proteins. The molecular weight is approximately 25,000, as determined by both ultracentrifugation and by amino acid analysis. The amino acid analysis of one form of the product is shown in Table I.

TABLE I.—AMINO ACID COMPOSITION OF THREE PREPARATIONS OF ACTIVE FACTOR

|  | Average micro mols amino acid per mg. protein | Average mols amino acid per mol protein [1] | Average deviation (percent) |
|---|---|---|---|
| Amino acid: |  |  |  |
| Lysine | 0.598 | 15.0 | 3.0 |
| Histidine | 0.175 | 4.3 | 7.9 |
| $NH_3$ | 0.667 | 16.7 | 0.5 |
| Arginine | 0.275 | 6.9 | 1.3 |
| Tryptophan [2] | 0.042 | 1.0 | -- |
| Aspartic acid | 0.806 | 20.7 | 3.0 |
| Threonine | 0.458 | 11.4 | 5.4 |
| Serine | 0.524 | 13.1 | 3.8 |
| Glutamic acid | 1.208 | 31.0 | 4.5 |
| Proline | 0.616 | 15.4 | 3.2 |
| Glycine | 0.713 | 17.9 | 6.2 |
| Alanine | 0.726 | 18.2 | 3.1 |
| Half cystine | 0.202 | 5.0 | 6.0 |
| Valine | 0.644 | 16.1 | 1.9 |
| Methionine | 0.121 | 3.0 | 4.1 |
| Isoleucine | 0.349 | 8.7 | 5.4 |
| Leucine | 0.552 | 13.8 | 5.8 |
| Tyrosine | 0.150 | 3.8 | 8.0 |
| Phenyl alanine | 0.241 | 6.0 | 5.0 |
| Overall average |  |  | 4.3 |

[1] Assumes molecular weight=25,000.
[2] Tryptophan determined separately by chromatography.

The bulk of the amino acids in the foregoing analysis were determined quantitatively by ion exchange chromatography in an automatic amino acid analyzer following hydrolysis in 6 M HCl at 110° in vacuo. The hydrolysis was carried out at two different times for each preparation, in order that corrections could be made kinetically for the destruction of serine and threonine and for the slow release of valine, isoleucine and leucine. The half-cystine (cysteine+cystine) content was determined by performic acid oxidation according to the method of Schram et al. (Biochem. J. 57, 33 (1954)) followed by chromatographic analysis on the automatic analyzer. The analysis for tryptophan was done in two ways. The first was the spectrophotometric technique of Goodwin and Morton (Biochem. J. 40, 628 (1946)); the second procedure used involved the alkaline hydrolysis described by Dreze and Reith (Biochem. J. 62, 3 P. (1956)) followed by chromatographic analysis on columns of starch (Moore and Stein, Ann. N.Y. Acad. Sci., vol. XLIX, 265 (1948).

The results of the amino acid analysis for the majority of the amino acids and for half-cystine are presented in Table I, which present amino acid analyses of 20-hour hydrolysates and 70-hour hydrolysates. The amino acid composition is presented in two ways (1) as micromoles amino acid per milligram protein, (2) as mols amino acid per mol protein.

The spectrophotometric analysis for tryptophan indicated 0.333 micromole tryptophan per mg. protein, which corresponds to 0.0061 mg. tryptophan residue per mg. protein. Since this value turned out to be very much smaller than the amount of tyrosine present, and since a high ratio of tyrosine to tryptophan is known to lead to slightly low results in tryptophan analysis by this method, basic hydrolysis and chromatographic isolation was resorted to. The latter procedure yielded 0.042 micromole tryptophan per mg. protein for both 15-hour hydrolysis and 40-hour hydrolysis, indicating that no correction is needed for hydrolytic destruction. This figure for the tryptophan content corresponds to 0.0078 mg. tryptophan residue per mg. protein.

One of the most striking results of these analyses is the neat integral relationships among tryptophan, tyrosine, methionine and half-cystine. If a molecular weight of 25,000 is assumed (as indicated in ultracentrifugal studies), the following relationships hold:

TABLE II

| Amino acid: | Residues/mole protein |
|---|---|
| Tryptophan | 1.0 |
| Methionine | 3.0 |
| Tyrosine | 3.8 |
| Half-cystine | 5.0 |

Since these small values are essentially a series of integral numbers, the closeness of these figures to integral values is an extremely strong support to the conclusion that these preparations are homogeneous. They may also be used in calculating a minimum molecular weight to give the results shown below:

TABLE III

| | Residues assumed per mole protein | Calculated minimum molecular weight |
|---|---|---|
| Amino acid: | | |
| Tryptophan | 1.00 | 23,800 |
| Methionine | 3.00 | 24,800 |
| Tyrosine | 4.00 | 26,600 |
| Half-cystine | 5.00 | 24,400 |

The presence of five half-cystine groups indicates that there is at least one free thiol group and possibly more. Accordingly, the free thiol group or groups is available to modify the protein by metal ions or oxidation, for example.

The presence of five mols half-cystine is a distinction from insulin. Insulin has 12.3% half-cystine while the protein of the present invention has only 2.5%.

The proteinaceous structure is suggested also by the ratio of acidic to basic amino acids. Thus, it will be noted from Table I that the average mols lysine and arginine total 21.9, whereas the average mols aspartic acid and glutamic acid total 51.7, giving a ratio of acidic to basic amino acids of 2.35. This is typical of many proteins.

The proline levels average 15.4 mols, as shown by Table I. This fairly high level indicates a low percent of helical structure. Further evidence that the structure is not highly globular or aggregated in structure is found in the fact that the ratio of hydrophilic to hydrophobic amino acid is about two to one. The foregoing amino acid analysis relates to the protein of the present invention as derived from beef liver. However, the question of identifying a protein is at present a highly difficult one since a substance may have very similar biologic activity when derived from different tissues of a single species or derived from the same tissue from a variety of species and yet vary considerably in exact peptide structure. For example, insulin differs in structure by one amino acid if human and porcine insulin are compared but approximately half of the molecule (some 25 of the 51 amino acids) are different when human and fish insulins are compared. Despite these differences in exact structure biologic activity per milligram weight of these insulins are essentially the same as indicated by L. F. Smith, American Journal of Medicine, vol. 40, p. 662 (1966).

Similar differences in amino acid structure from species to species have been noted in almost all natural biologic peptides. Therefore, although exact amino acid content of the invention has been determined when bovine liver was used as a source, there will be some variation among species.

The process used in deriving the protein of the present invention includes extraction from raw source material, followed by suitable purification, as by electrochromatography.

The protein derived by the process of FIG. 1, presently to be described, ordinarily contains only about 4 to 6% of the protein of the present invention. While this extract is much more concentrated than raw source material, such as liver, it is not concentrated sufficiently for most practical purposes. Accordingly, the product of solvent fractionation as in FIG. 1 is referred to herein as "crude." It has, in most instances, less than 6% of the protein of this invention. The term "partially purified" is intended to designate that protein which has been subjected to electrochromatography and purified to some extent beyond the initial preparation. Purification to at least 20% is expedient, and for many purposes we prefer "partially purified" protein to have a concentration of 50%. The term "pure" is used herein to designate the maximum purity obtained from the electrochromatographic curtain. In most instances, this will be about 97% or greater.

The protein of the present invention is susceptible to inactivation by oxidation. The protein of this invention may be stabilized with reducing agents, such as thioglycerol. Suitable polyvalent metal ions may also be used to stabilize the protein. In particular, manganese and magnesium serve to stabilize the protein for extended periods.

The protein of the present invention is prepared by multiple extractions from any suitable source materials. Glandular and central nervous system organs of mammals, birds and fishes are sources of the protein. The liver of mammals is a preferred source of the desired protein and mammalian kidney, spleen and placenta are satisfactory. When liver is used it is diced and macerated and treated first with a divalent metal ion suitable for activating a biologically active protein in step 1. The preferred divalent metal ions are $Mn^{++}$ or $Mg^{++}$. The pH of the metal ion solution should be essentially neutral or slightly alkaline. A suitable range is pH 6.5 to 8. This pH may be achieved with any suitable buffer, such as dilute sodium acetate or a glycine buffer. The liver with divalent metal ion should be permitted to stand for a sufficient period to permit complete interaction of metal and protein components. The precise nature of the interaction is not entirely clear, but it is known that certain proteins, such as enzymes, have an affinity for certain divalent metals. The manganous ion is preferred, possibly because it is a reduced form of the metal ion. The divalent metal should be introduced in water soluble form. With the manganous ion, the sulfate or dichloride salts are conveniently used. We have found that concentration of the divalent metal ion is conveniently in the range of 0.08 to 0.15. Preferably, a manganous salt is introduced in a concentration of about 0.09 molar. It is also preferred to cool the mixture of divalent metal and source material upon standing. 5° C. has been found to be a convenient temperature. After standing, the solids are centrifuged and discarded.

After separation of solids from the divalent metal treatment, the liquid is treated in step 2 with a metal precipitating agent for precipitating the insoluble protein complex from step 1. Suitable metal ions for the precipitation phenomenon include lead, zinc, silver, copper and barium, with lead and zinc being preferred. Concentration of the precipitating agent will depend on the metal ion selected, but ordinarily concentration should be in the range of 0.05 to 0.20 molar. Where lead or zinc in the acetate form is used, a concentration of 0.12 M is preferred. The anion is not critical; acetate being selected for its buffering properties. Other suitable anions for the precipitating agent are citrate and phosphate.

Precipitation in step 2 should be complete, so it is preferred to let the mixture stand for at least 12 hours. Also, it is preferred to precipitate at low temperature, such as 5° C.

After precipitation, the mixture is centrifuged and the precipitate discarded. The supernatant is adjusted to a pH in the range of 8.3 to 8.5 in step 3. Adjustment to this pH range may be accomplished in any conventional way, such as by adding NaOH. The preferred pH is 8.4, but a range of 0.05 pH on either side gives the same preferred result.

With the pH adjusted, the liquor is again permitted to stand, preferably cool, to enable formation of additional solids at the higher pH. When precipitation is complete, the extract is again centrifuged and the precipitate is discarded.

In step 4 the supernatant is treated with another precipitating agent to effect salting out of further undesired components. This step is carried out in the conventional way to precipitate proteins. Ammonium sulfate is a standard salt for this precipitation, but other equivalent precipitating agents such as half saturated sodium sulfate may be used, so long as the effective concentration is the same. We have found that the salting out agent should be added to the supernatant of step 3 in such an amount that the equivalent of between 20 and 30% of the total solution is salting out agent, based on ammonium sulfate. With saturated sodium sulfate, for example, the final concentration may be in the range of 10–15%, which is the equivalent of 20–30% ammonium sulfate. The preferred concentration is 25% with ammonium sulfate. When salting out is complete, solids are again removed by centrifuge and discarded. Next, the supernatant liquid is treated with a suitable solvent for fractionation. Lower alkanols and lower ketones are satisfactory with acetone being the preferred solvent. Other solvents such as ethanol, methanol, propanol, isopropanol or butanol, or mixtures thereof, are suitable for solvent fractionation.

The procedure to this point is similar to that outlined in the Mohamed and Greenberg article referred to above. At this point, however, a complete departure from the previously described process takes place. Thus, the solvent fractionation is continued under conditions which cause liquid separation into three separate phases. The uppermost phase is saved, whereas in Mohamed and Greenberg, it is discarded.

Solvent extraction in step 5 is conveniently accomplished by first adding solvent, such as acetone, to the supernatant of the ammonium sulfate step in an amount to make the solvent between 20 and 26% of the total volume. Upon standing, additional precipitates are formed which are removed in any suitable manner, as by centrifuge. A second extraction with solvent follows, this time with solvent constituting between 35 and 40% of the volume of the liquid total. The liquid separates into three phases upon standing, and the middle and lower phases may be discarded. The upper phase, which is retained, is high in solvent concentration ranging from about 44 to 50% solvent.

The third solvent fractionation is carried out by increasing the solvent concentration still further to a range of about 70 to 77% by volume. Upon standing, the precipitated solids are separated, as by centrifuge, and the solids, containing the low molecular weight protein of the present invention, are retained.

The solids of step 5 are then resuspended in step 6 in liquid for subsequent dialysis. Resuspension is suitably done by diluting the solids with a slightly alkaline buffer. We prefer a phosphate buffer, such as potassium phosphate at a pH of about 8.0, but a range of pH 7.8 to 8.2 is acceptable. The undissolved solids, not including the desired protein are then removed, as with a centrifuge, and the supernatant is retained.

In step 7, the supernatant is dialyzed against distilled water. It is convenient to dialyze at 5° C. until conductivity less than 0.5 p.p.m. calculated as NaCl. The liquid recovered is separated from solids, as by centrifuge and precipitate discarded.

In step 8, the supernatant is heated to a temperature within the range of 46–50° C. A water bath may be used, and heating should be long enough to completely precipitate solids removable at this temperature, preferably for an hour. The preferred temperature is 47° C. Solids are again removed, as by centrifugation.

After heating in step 8, the crude product is obtained, having a concentration of about 15% of the biologically active, low molecular weight protein previously described. The crude product is preferably separated into its active components. This is conveniently accomplished by electrophoresis in step 9. Curtain, paper, or gel electrophoresis may be used.

Example 1

Four kilograms of fresh steer liver are taken and capsule, fascia, fat and large blood vessels are removed. The liver is then diced into one-inch square sections which are then macerated in a Waring blender, with 8 liters of 5% sodium acetate buffer, pH 7.35 containing 1.54% of manganous sulfate monohydrate. This mixture is stirred at 5° C. for 10–12 days and is then centrifuged and the undissolved material and precipitate are discarded.

Then 4 liters of plumbous acetate containing 45.75 grams $Pb(C_2H_3O_2)_2 \cdot 3H_2O$ per liter of water is added and the extract is allowed to stand at 5° C. for 18–24 hours. It is then centrifuged and the precipitate is discarded.

The supernatant liquor is adjusted to a pH of 8.4±0.05 by adding 0.2 N sodium hydroxide. It is then allowed to stand at 5° C. for 18–24 hours and is then centrifuged. The precipitate is discarded.

Then one volume of saturated ammonium sulfate solution (saturated at 20° C.) is added to three volumes of the supernatant from the foregoing step and the mixture is allowed to stand at 5° C. for 18–24 hours and then is centrifuged. The precipitate is discarded.

Acetone is then added in the amount of 25.9% by volume of the total liquid (i.e., 25.9% of the volume of supernatant+acetone) and the liquid is allowed to stand at 5° C. for 18–24 hours. It is then centrifuged and the precipitate is discarded.

Then an additional quantity of acetone is added to bring the acetone concentration to 37.5% of the total volume. The liquid is then allowed to stand at 5° C. for 18–24 hours and is decanted. The liquid will separate into three phases. The uppermost phase is saved while the middle, solid phase and the lowermost liquid phase are discarded.

To the upper liquid phase from the foregoing step, which contained about 44–50% acetone, is added an equal volume of acetone, making a total acetone concentration of about 72 to 75% by volume. This liquid is allowed to stand at 5° C. for 18–24 hours. It is then centrifuged. The supernatant liquid is discarded and the precipitate in this step retained and is treated further by suspending it in an aliquot of 0.1 N potassium phosphate buffer at a pH of 8.0. The resultant solution of protein solids is not less than 0.1%. It is then centrifuged and the precipitate is discarded.

The supernatant from the foregoing step is then subjected to dialysis against distilled water at 5° C. until it has a conductivity less than 0.5 p.p.m. calculated as NaCl. It is then centrifuged and the precipitate is discarded.

The product in the supernatant is further purified by heating on a water bath at 46–50° C. The preferred temperature is 47° C. for about one hour.

At this point, the crude product has about six different protein components, as determined by microelectrophoresis. Of these, the one defined below as Component II possesses the most biologic activity. This component usually represents about 4 to 6% of the total protein in the product of the method of Example 1, where bovine liver is the source material. In any event, concentrations no greater than 15% of the protein of the invention are recoverable using the process of Example 1.

The crude product of Example 1 is then subjected to electrochromatography which allows for the fractionation of a complex mixture of proteins of different electrical potentials and chromatographic characteristics by simply collecting the flow from each of the dip points at the bottom of the hanging curtain. A large curtain mechanically refrigerated automatic apparatus is used as described in Karler, "Separation by Continuous Electrochromatography," Anal. Chem. 31:848–851 (1959). The curtain material was in the form of Schleicher and Schuell No. 470-A filter paper, 50 cm. by 50 cm., with 31 drip points each 16 mm. wide. Buffer or background electrolyte was a 0.065 N, pH 6.7 solution of ammonium acetate in purified water. The lot or sample was applied at a rate of 5 ml. per hour at a point just slightly to the left of the center of the curtain. The anode was on the left side of each curtain. The temperature and humidity of the rapidly circulating cold air (800 cubic feet per minute over the curtain) was maintained at 3° C. and 96% humidity. The electric current was direct current of the unfiltered full wave rectified type of a level of 1800 volts at 65 milliamperes. After it became apparent that all residual fractionating material had cleared the curtain, each drip point was examined for total solids by drying to constant weight at 105° C. A sample of each drip point was measured for biological activity by the glucose uptake activity (referred to sometimes hereinafter as "glucose activity") described below. Subsequent to this, each drip point showing biological activity was examined electrophoretically by using cellulose polyacetate membrane as support medium (Bier, M. Ed. "Electrophoresis: Theory, Methods, and Applications," Academic Press, 1959).

Figure 2:
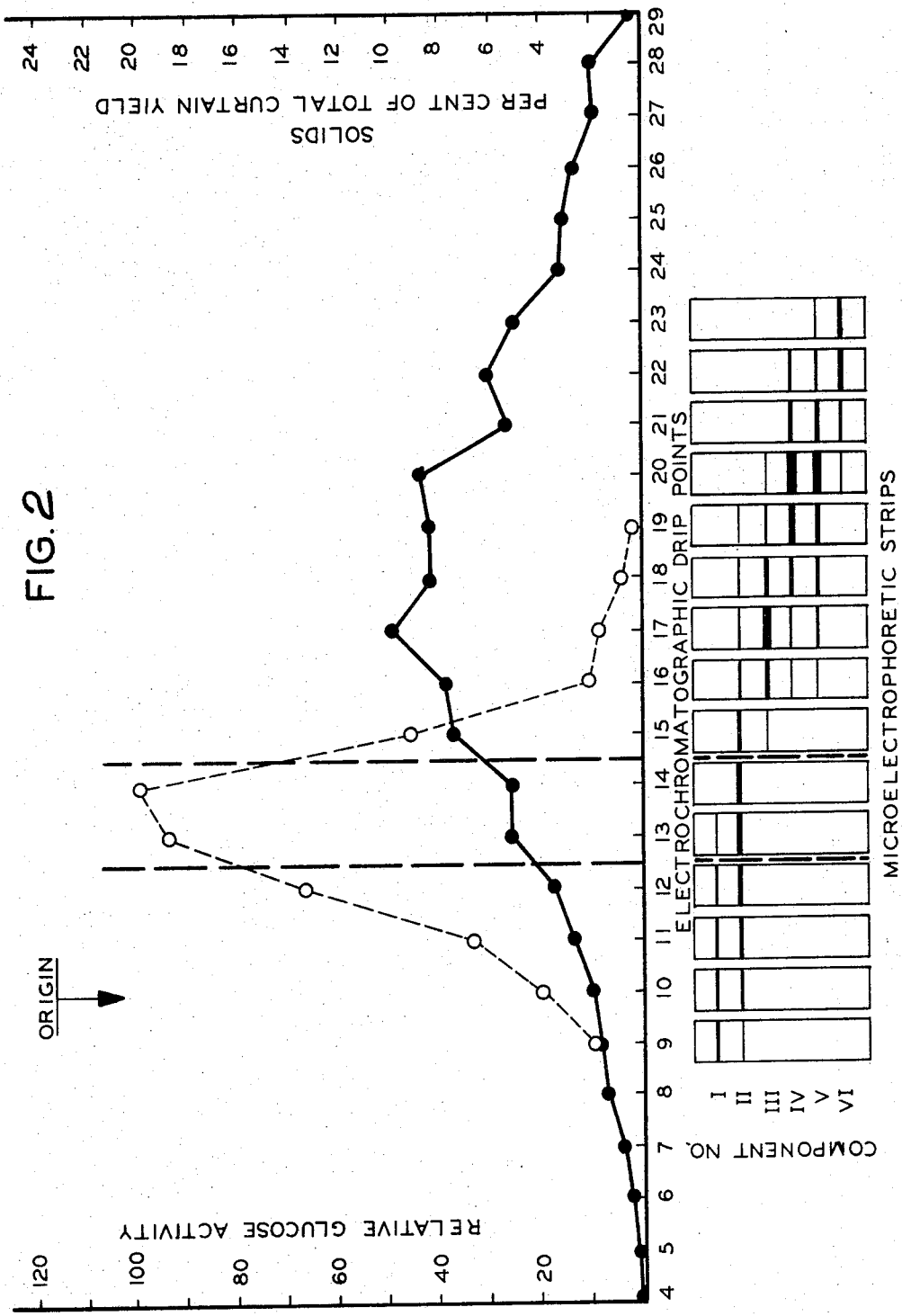
FIG. 2 is an electrochromatogram showing a typical electrophoretic pattern of the crude product containing six protein components.

We have found that the less pure protein derived according to the present invention tends to have a greater stability than the completely purified form. The presence of other components from the electrophoretic curtain is sometimes desirable from a stability standpoint. Moreover, for some end uses, the properties of other factors in the crude material may be useful without detriment to the activity of the protein of this invention. For that reason, one or more of the other components besides Component II of FIG. 2 in the composition may be utilized. Concentration and purification by paper electrochromatography results in a composition having the protein of the present invention present in a purity up to about 97%. Purity is established using a Beckman-Spinco Analytrol apparatus. A purity within the range between the protein content of the crude extract of Example 1 and the substantially pure protein may be selected as desired from the electrochromatographic curtain. For most purposes, a concentration of 20% or greater of the protein is desirable. Preferably, at least 50% concentration of the protein of this invention should be present to be certain that properties of other ingredients of the crude composition will not be exhibited. Curtain electrophoresis is best performed with ammonium buffer. However, an acetic acid buffer is suitable, so long as metal ions, which are stripped with acetic acid buffer, are replaceed. That is, the product is activated by the presence of metal ions. Suitable metal ions include manganese, magnesium, zinc, nickel, cobalt and copper. Preferably, the ammonium ion may be used to stabilize the purified product, thus obviating the need for added stabilizing metal ion after recovery of the product from curtain electrophoresis.

Infra-red absorption scan on the purified material shows that the protein of the present invention is a simple protein or polypeptide. No significant concentration of lipid or carbohydrates was indicated. The infra-red patterns were negative for nucleic acids, steroids and phosphate group. Standard tests for glutamic-oxalo-acetic transaminase, glutamic-pyruvic transaminose, arginase, alkaline phosphatase and acid phosphatase revealed none of these to be present. Emission spectrographic tests revealed only trace amounts of metallic ions.

An analysis of the terminal groups of the protein of this invention was carried out using the method described in Gray, W. R. and Hartley, B. S., Biochem., J. 89: 379 (1963). The amino terminal residue of the pure protein appears to be blocked by acylation, probably acetylation. No alpha amino group was found even though the method would have detected one ten-thousandth of the amount expected based on total protein found. Thin-layer chromatograms revealed the usual major side-products, and indications of the presence of tyrosine and lysine. No other spots were detected. The lack of contaminating end groups of other amino acids indicate that an exceedingly high degree of purity was obtained in the sample.

Figure 3:
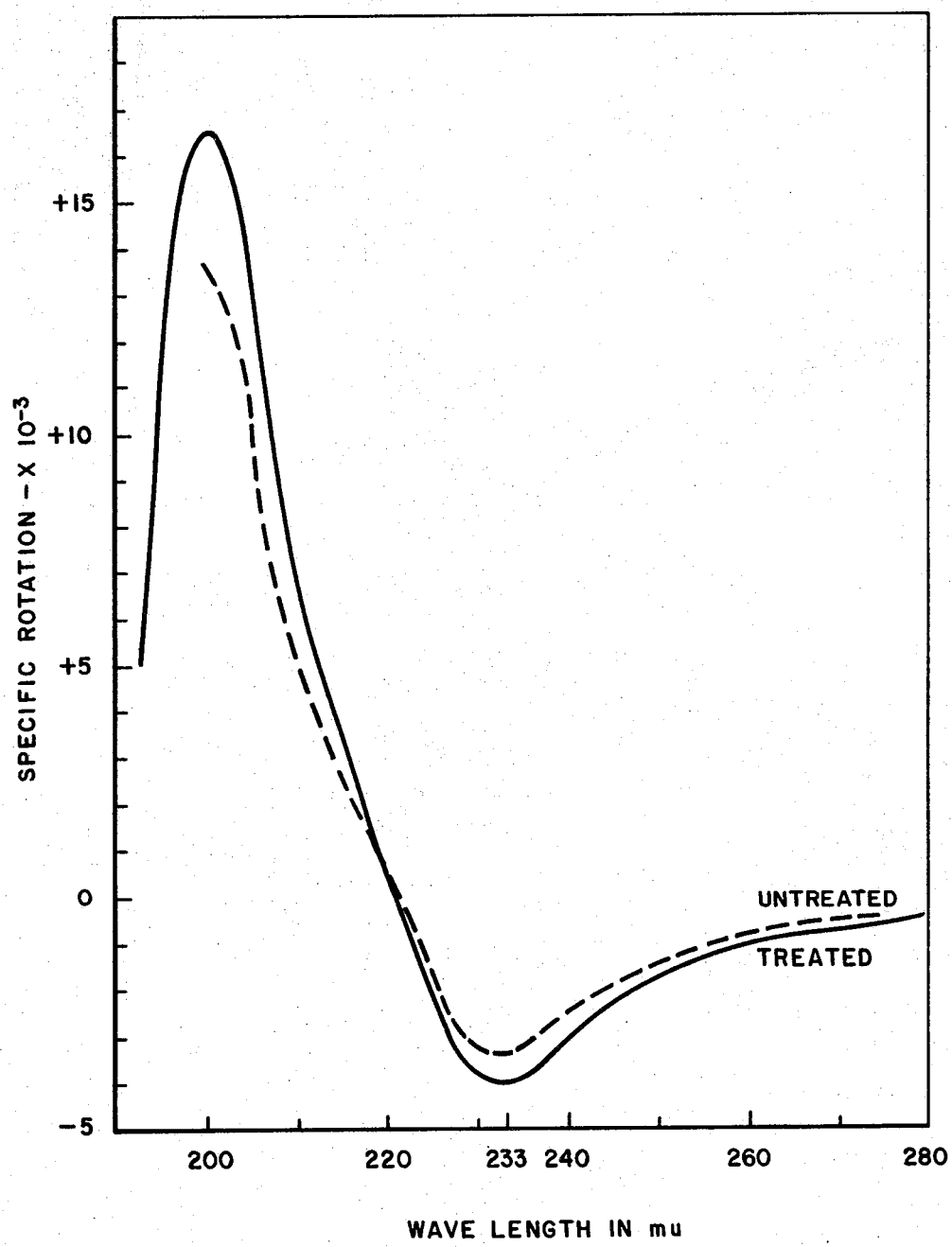
FIG. 3 is a graph illustrating the optical rotary dispersion of the protein of the present invention.

In order to determine the amount of $\alpha$-helices, the optical rotary dispersion of the purified protein was measured with the Cary 60 recording spectropolarimeter at 25° C. under constant nitrogen flush. FIG. 3 is a graph of specific rotation versus wavelength. Two samples were tested; one treated with manganese shown in a solid line, and the other untreated, shown in a dotted line in FIG. 3. It will be noted that FIG. 3 shows a trough at 233 m$\mu$, which is characteristic of the $\alpha$-helix. The optical rotary dispersion of the two samples also shows a peak near 200 m$\mu$, which is close to the 198 m$\mu$ maximum for an $\alpha$-helix. Using the technique for estimating the amount of helical content described by Yang in Fasman, Ed. "Poly . . . Amino Acids," Marcel Dekker (1967), the metal-treated sample was found to have about 15% helices and the untreated sample has about 10%.

The isoelectric point for the untreated protein of the present invention was determined to be at pH 5.40. With metal treated protein, the isoelectric point is 5.80. On all samples, the isoelectric point has been determined to be between pH 5 and 6.

It will be understood that commercial preparations employing the active factor of the present invention may contain, besides concomitant proteins, other materials. As used for intravenous and intramuscular injection (which are at present the preferred modes of administration) the material will be dissolved in water which may be made isotonic with sodium chloride, glycine, dextrose, glucose or the like. Other pharmaceutically compatible excipients are suitable for use with the protein. Other modes of administration include intraperitoneal, subcutaneous, intradermal, buccal and suppository. Other proteins may be added; also antibiotics such as penicillin; vitamins such as ascorbic acid and vitamin $B_{12}$; etc. The material may be lyophilized for storage and reconstitution.

It will be apparent that the present invention provides a new simple protein of molecular weight of about 25,000 which exhibits biological activity, particularly in the treatment of uremia where the properties of facilitating glucose absorption and glycogen synthesis are of value. The invention also includes the method of preparation of the protein from a suitable source, such as liver. The method of using the invention includes injection of the protein for the treatment of uremia, inflammation an shock in mammals. The protein influences the metabolism of carbohydrate and the urea cycle.

We claim:
1. A method of extracting a biologically active protein from liver comprising the steps of:
   (a) treating liver with an aqueous solution of divalent metal activating cation at a pH essentially neutral or slightly alkaline and separating the resultant solids from the liquid;
   (b) treating the liquid with heavy metal precipitating agent and separating the resultant precipitate from the liquid;
   (c) adjusting the pH of the liquid from step (b) to a range of between 8.3 and 8.5 and separating the resultant precipitate from the liquid;
   (d) treating the liquid from step (c) with a concentrated solution of salting out agent to precipitate undesired protein and separating the protein precipitate from the liquid;
   (e) adding solvent to the liquid from step (d) in an amount sufficient to give the resultant mixture a solvent concentration of 20 to 26% by volume and separating the resultant precipitate from the liquid; adding solvent to the liquid in an amount sufficient to give the resultant mixture a solvent concentration to 35 to 40% by volume to produce a mixture having three layers; separating the upper layer and adding to it in amount sufficient to give the resultant mixture a solvent content 70 and 77% by volume whereby protein is precipitated;
   (f) separating the protein precipitate and dispersing it in a solvent at a pH of 7.8 to 8.2;
   (g) dialyzing the dispersion from step (f);
   (h) heating the dialyzate from the step (g) to a temperature between 46 and 50° C. and separating the resultant precipitate from the liquid;
   (i) subjecting the liquid from step (h) to electrophoresis and recovering a biologically active protein.

2. A method as in claim 1 wherein the divalent metal ion of step (a) is either $Mn^{++}$ or $Mg^{++}$ in a concentration between 0.08 and 0.15.

3. A method as in claim 1 wherein the precipitating agent of step (b) is selected from the group consisting of lead, zinc, silver, copper and barium in a concentration between 0.05 and 0.20.

4. A method as in claim 1 wherein the pH is adjusted in step (c) to the range of 8.35 to 8.45.

5. A method as in claim 1 wherein the salting out agent of step (d) is ammonium sulfate in a final concentration of 25% saturation.

6. A method as in claim 1 wherein the solvent of step (e) is acetone.

7. A method as in claim 1 wherein curtain electrophoresis is used in step (i) and component II is recovered.

8. A method of extracting a biologically active protein from liver comprising the steps of:
   (a) treating liver with a 0.09 molar solution of $Mn^{++}$ ion, cooling and discarding solids;
   (b) treating the supernatant with $Pb^{++}$ ion to precipitate solids, cooling and discarding solids;
   (c) adjusting the pH to the range of 8.35 to 8.45, cooling and discarding precipitate;
   (d) treating the supernatant with ammonium sulfate at a final concentration of about 25% saturation; cooling and discarding precipitate;
   (e) adding acetone to between 20-26% by volume, cooling and discarding precipitate;
   (f) adding further acetone to between 37 and 38% by volume, cooling and discarding precipitate and lowermost phase;
   (g) adding additional acetone to a concentration between 72 and 75% by volume to precipitate the desired protein and separating the protein precipitate;
   (h) resuspending the desired protein in phosphate buffer at pH of about 8.0, and discarding solids;
   (i) dialyzing the supernatant against distilled water at 5° C.;
   (j) heating the dialyzate to about 47° C.;
   (k) subjecting the dialyzate to curtain electrophoresis with ammonium buffer and recovering component II.

9. A method of protein extraction comprising macerating mammalian liver with 5% sodium acetate buffer at a pH of 7.35 containing 1.54% manganous sulphate monohydrate, separating insoluble materials from the supernatant, adding a solution containing 45.75 grams plumbous acetate trihydrate per liter of water to the supernatant, separating insoluble materials from the supernatant, adjusting the pH of the supernatant to $8.4 \pm 0.05$, separating insoluble materials from the supernatant, adding saturated ammonium sulfate to the supernatant, separating the insoluble materials from the supernatant, adding acetone to the supernatant in the amount of 25.9% by volume of the total liquid, separating insoluble materials from the supernatant, adding additional acetone to the supernatant to bring the acetone concentration to 37.5% of the total volume whereby the liquid separates into three phases, separating the uppermost phase from remaining phases, adding acetone to the separated phase to make the total acetone concentration about 72 to 75% by volume, separating the precipitate and retaining it, suspending the solids in 0.1 M potassium phosphate buffer at pH of 8.0, separating the precipitate and treating the supernatant by dialysis against distilled water until it has a conductivity less than 0.5 p.p.m. calculated as NaCl, separating the supernatant from the precipitate and heating it to about 46 to 50° C., separating the protein components by microelectrophoresis and recovering a protein having biological activity.

10. The product of the method of claim 1.
11. The product of the method of claim 8.
12. The product of the method of claim 9.

References Cited

FOREIGN PATENTS 1,160,151   7/1969   Great Britain.

OTHER REFERENCES

Archives of Biochemistry, 1945, Mohamed et al., vol. 8, pp. 349–364.

HOWARD E. SCHAIN, Primary Examiner

U.S. Cl. X.R.

424—177